US008645622B2

(12) United States Patent
Menon et al.

(10) Patent No.: US 8,645,622 B2
(45) Date of Patent: Feb. 4, 2014

(54) METHOD TO PROTECT DATA ON A DISK DRIVE FROM UNCORRECTABLE MEDIA ERRORS

(75) Inventors: Jaishankar Moothedath Menon, San Jose, CA (US); Krishnakumar Surugucchi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1874 days.

(21) Appl. No.: 10/716,136

(22) Filed: Nov. 18, 2003

(65) Prior Publication Data

US 2005/0108594 A1     May 19, 2005

(51) Int. Cl.
*G06F 11/10*         (2006.01)

(52) U.S. Cl.
USPC .......................................... 711/114; 714/6.24

(58) Field of Classification Search
USPC .......................................... 711/114; 714/6.24
See application file for complete search history.

(56) References Cited

U.S. PATENT DOCUMENTS

| 5,265,104 | A | | 11/1993 | Weng |
| 5,396,620 | A | | 3/1995 | Burghart et al. |
| 5,469,453 | A | * | 11/1995 | Glider et al. ...................... 714/6 |
| 5,526,507 | A | * | 6/1996 | Hill ................................ 711/114 |
| 5,644,697 | A | | 7/1997 | Matsumoto et al. |
| 5,737,344 | A | | 4/1998 | Belser et al. |
| 5,940,233 | A | | 8/1999 | Malone, Sr. |
| 5,958,067 | A | * | 9/1999 | Kaneda et al. ...................... 714/6 |
| 5,996,105 | A | | 11/1999 | Zook |
| 6,092,231 | A | | 7/2000 | Sze |
| 6,237,052 | B1 | | 5/2001 | Stolowitz |
| 6,311,251 | B1 | * | 10/2001 | Merritt et al. .................. 711/114 |
| 6,397,292 | B1 | | 5/2002 | Venkatesh et al. |
| 6,415,355 | B1 | * | 7/2002 | Hirofuji ......................... 711/114 |
| 6,535,955 | B1 | | 3/2003 | Huang et al. |
| 6,606,629 | B1 | * | 8/2003 | DeKoning et al. ............. 707/100 |
| 6,851,082 | B1 | * | 2/2005 | Corbett ......................... 714/770 |
| 2002/0174295 | A1 | | 11/2002 | Ulrich et al. |
| 2004/0107400 | A1 | * | 6/2004 | Servi et al. ..................... 714/800 |
| 2004/0141387 | A1 | * | 7/2004 | Hanji et al. .................... 365/200 |
| 2005/0015700 | A1 | * | 1/2005 | Hetzler et al. ................. 714/766 |

FOREIGN PATENT DOCUMENTS

EP          05692236       11/1993

OTHER PUBLICATIONS

S. Jay, "OneWorld Xe Performance, Comparison of RAID 5 vs. RAID 10, Performance on an IBM FASIT500 Storage Server," IBM/J.D. Edwards Technical Brief, Version: 1.0, Jan. 2003.
Integrated CRC for Sector Buffer Memory and Disk Drive, IBM Research Disclosure, 409103, p. 616, May 1998.
J. Anglin at al., "RAID technology and IBM TotaiStorage NAS products," IBM TotalStorage Network Attached Storage, Oct. 2001.

* cited by examiner

*Primary Examiner* — Jared Rutz
(74) *Attorney, Agent, or Firm* — Kenneth L. Sherman, Esq.; Michael Zarrabian, Esq.; Sherman & Zarrabian LLP

(57) ABSTRACT

Protection from uncorrectable media errors are provided for a RAID-configured storage system by a technique in which c redundancy information sectors are associated with n data information sectors. The n data sectors and c redundancy information sectors are then written as a single segment on a single storage unit. The RAID-configured storage system can be configured, for example, as a RAID 6 storage system, a RAID 5 storage system, a RAID 51 storage system, a RAID 3+3 storage system or a RAID N+3 storage system. The redundancy information can be based on a Reed-Solomon code, an XOR-based code, or one-dimensional parity.

27 Claims, 3 Drawing Sheets

METHOD TO PROTECT DATA ON A DISK DRIVE FROM UNCORRECTABLE MEDIA ERRORS

BACKGROUND OF THE INVENTION

1. Field of the Invention

The present invention relates to storage systems. More particularly, the present invention relates to a system, a method and a storage format that provides protection against uncorrectable media errors.

2. Description of the Related Art

FIG. 1 shows an exemplary high-RPM Hard Disk Drive (HDD) 100 having a two-stage servo system for positioning a magnetic read/write head (or recording slider) 101 over a selected track on a magnetic disk 102. The two-stage servo system includes a voice-coil motor (VCM) 103 for coarse position a read/write head suspension 104 and a microactuator, or micropositioner, for fine positioning read/write head 101 over the selected track in a well-known manner. Binary data is stored on magnetic disk 102 by selectively orienting magnetization in user data fields in the magnetic media of disk 102.

The two primary sources of data loss from HDDs, such as the exemplary HDD shown in FIG. 1, are disk drive failure and uncorrectable media error. Data loss has been conventionally prevented by configuring storage systems having an array of multiple HDDs in a RAID configuration in which data is striped across multiple HDDs. Redundancy is built into the striping so that should any HDD fail, the data belonging to the failed HDD can be reconstructed from the remaining drives of the storage system.

HDD storage capabilities have been increasing at a rate of between 60 and 100 percent per year. The probability of uncorrectable read errors, however, has been relatively constant at about 1 uncorrectable read error in $10^{14}$ bits. Accordingly, as HDD storage capabilities have increased, the probability of data loss due to an uncorrectable media error has become a significant factor.

Multiple HDD storage systems configured as RAID level 5 systems are commonly deployed in the industry and can tolerate loss of a single disk HDD. While a failed HDD is being rebuilt, however, a second HDD failure or an uncorrectable media error on any of the remaining HDDs will result in data loss. Data loss caused by a second HDD failure is referred to as an "array loss," while data loss caused by an uncorrectable media error is referred to as a "strip kill." It is estimated that there will be 1.48 array losses and 2570 strip kills in a one-year period for an installed base of one million 300 GB HDDs that are configured in 8-drive RAID 5 array systems with each HDD having an MTBF of 500,000 hours. It should be noted that over 90% of media errors affect single sectors. About 5% of media errors affect two to four sectors. Very few media errors affect multiple (seven or more) sectors.

Techniques have been proposed for reducing the probability of data loss. In particular, RAID-type protection techniques have been developed for protecting against drive failure by increasing the redundancy of the array using levels (such as RAID 51, RAID 6, RAID (3+3) and so on). When a RAID level is chosen for a storage system, factors that are considered include storage efficiency, reliability and performance. Optimizing any one of these three factors causes at least one of the other factors to become less than optimal.

Table 1 is a comparison of the different conventional RAID techniques.

TABLE 1

|  | RAID 5 | RAID 51 | RAID (3 + 3) | RAID 6 | RAID N + 3 |
|---|---|---|---|---|---|
| Drives/array | 8 | 16 | 6 | 16 | 16 |
| Storage Efficiency | 87.5% | 43.75% | 50% | 87.5% | 81.25% |
| Annual Strip Kill events | 2570 | $6.17 \times 10^{-7}$ | $8.55 \times 10^{-7}$ | 1.61 | $7.53 \times 10^{-4}$ |
| Annual Array Loss events | 1.48 | $5.01 \times 10^{-8}$ | $3.56 \times 10^{-10}$ | $2.41 \times 10^{-3}$ | $1.51 \times 10^{-6}$ |
| Performance (IOs/writes) | 4 | 6 | 6 | 6 | 8 |

The parameters on which the reliability calculations in Table 1 are based are an installed base of one million 300 GB disk drives each having an MTBF of 500,000 hours and a hard error rate of 1 error in $10^{14}$ bits.

As can be seen from Table 1, a RAID) 6 system configuration provides an adequate protection against array loss events exhibiting only $2.41 \times 10^{-3}$ array loss events per year. The number of strip kills (i.e., 1.61 strip kill events per year) is too many to meet the requirements of high-end storage systems. Adding another level of protection comes at a price, such as reduced storage efficiency (i.e., a RAID (3+3) or a RAID 51 system configuration) or reduced performance (i.e., a RAID N+3 system configuration).

While RAID-type protection techniques have been developed for protecting against drive failure, RAID techniques do not protect well against uncorrectable media error and result in coarse granularity and sub-optimal tradeoffs. Consequently, what is needed is a technique that provides protection against uncorrectable media errors.

BRIEF SUMMARY OF THE INVENTION

The present invention provides a technique that provides protection against uncorrectable media errors.

The advantages of the present invention are provided by a method and a system for protecting data stored in a RAID-configured storage system from uncorrectable media errors. The RAID-configured storage system includes a plurality of storage units, such as HDDs, optical drives and/or random access memory. According to the invention, c redundancy information sectors are associated with n data information sectors, such that the c redundancy information sectors are based on the n data information sectors. The n data information sectors are written with c redundancy information sectors in a data segment on the same storage unit. The RAID-configured storage system can be configured, for example, as a RAID 6 storage system, a RAID 5 storage system, a RAID 51 storage system, a RAID 3+3 storage system or a RAID N+3 storage system. The c redundancy sectors effectively protect the n information sectors against up to c uncorrectable media errors in the n sectors. The redundancy information can be based on a Reed-Solomon code, an XOR-based code, or one-dimensional parity. The n data information sectors and the c redundancy information sectors can be arranged to be consecutive or intermingled.

The present invention also provides a storage medium having a recording format therein having c redundancy information sectors that are associated with n data information sectors to form a segment. The c redundancy information sectors are based on the n data information sectors, and the segment is stored on a single storage unit in an array of storage units in a RAID-configured storage system.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides protection against uncorrectable media errors by writing data and redundancy information on the same disk drive using a technique referred to as SPIDRE (Sector Protection through Intra Disk REdundancy).

Figure 1:
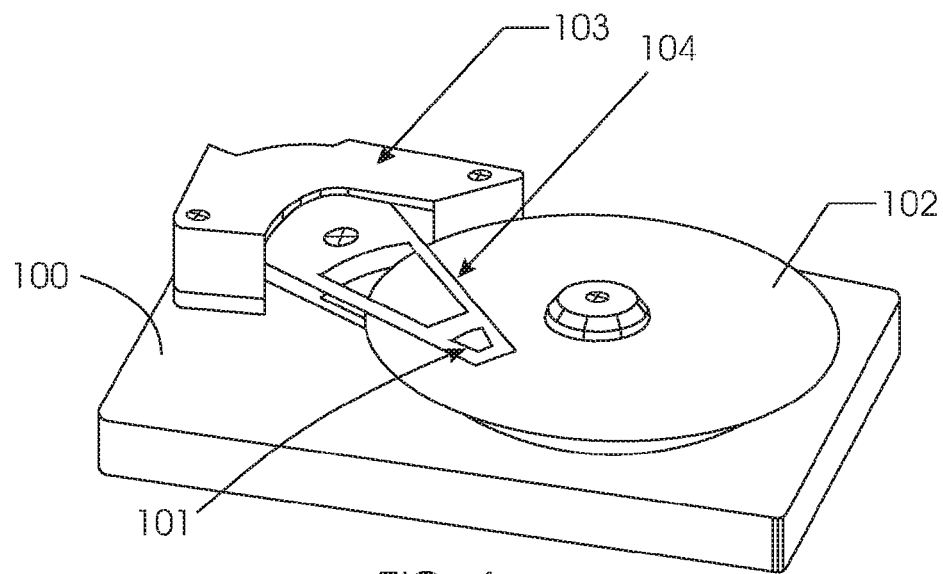
FIG. 1 shows an exemplary high-RPM Hard Disk Drive.
Figure 2:
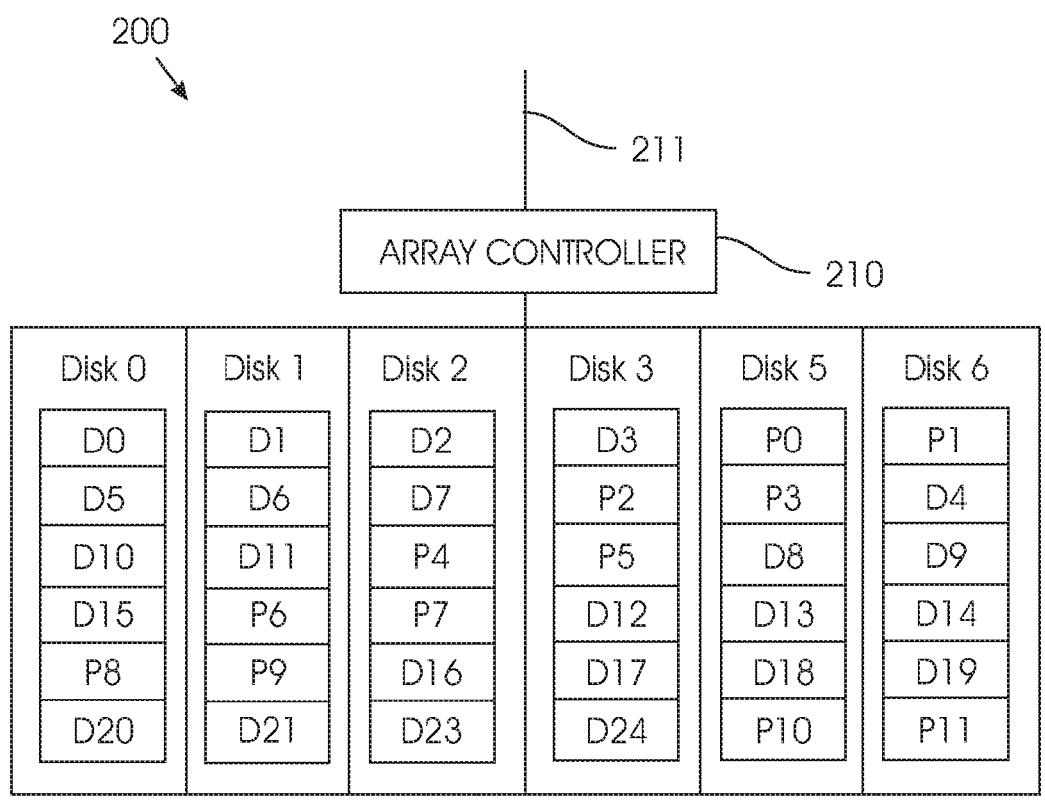
FIG. 2 shows an exemplary array arranged in a RAID 6 system configuration.

FIG. 2 shows an exemplary array 200 of six storage units, such as HDDs, arranged in a RAID 6 system configuration. For the exemplary RAID 6 system configuration shown in FIG. 2, parity is calculated based on data blocks arranged horizontally across storage units 0-6, similar to a RAID 5 system configuration, with a second set of parity that is also calculated based on data blocks arranged horizontally across the storage units. The first horizontal parity block is calculated, for example, as the XOR of the data blocks. The second horizontal parity block can, for example, be based on a Reed-Solomon code. Specifically, parity block P0 is based on data blocks D0-D3. Parity block P1 is also based on data blocks D0-D3. Parity blocks P2 and P3 are based on data blocks D4-D7. Parity blocks P4 and P5 are based on data blocks D8-D11. Parity blocks P6 and P7 are based on data blocks D12-D15. Parity blocks P8 and P9 are based on data blocks D16-D19. Parity blocks P10-P11 are based on data blocks D20-D24. An array controller 210 is commonly connected to all storage units in array 200. Array controller 210 communicates with other controllers and host systems (not shown) over interface 211. Array controller 210 may be designed as a hardware and/or a software controller.

Figure 3:
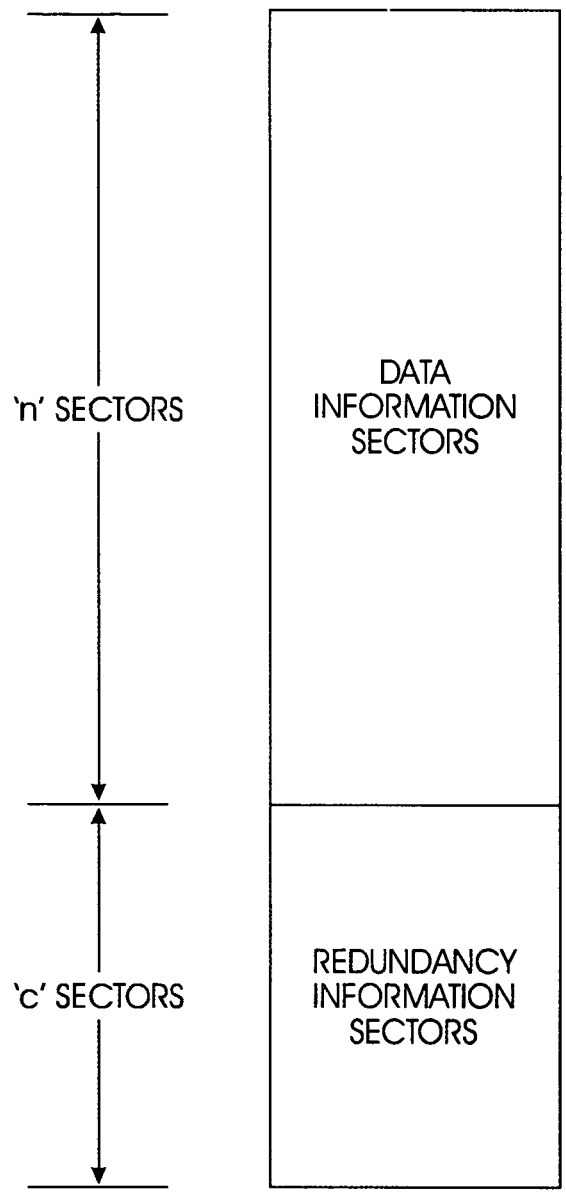
FIG. 3 depicts an exemplary format arrangement of n data sectors and c code sectors according to the present invention.
Figure 4:
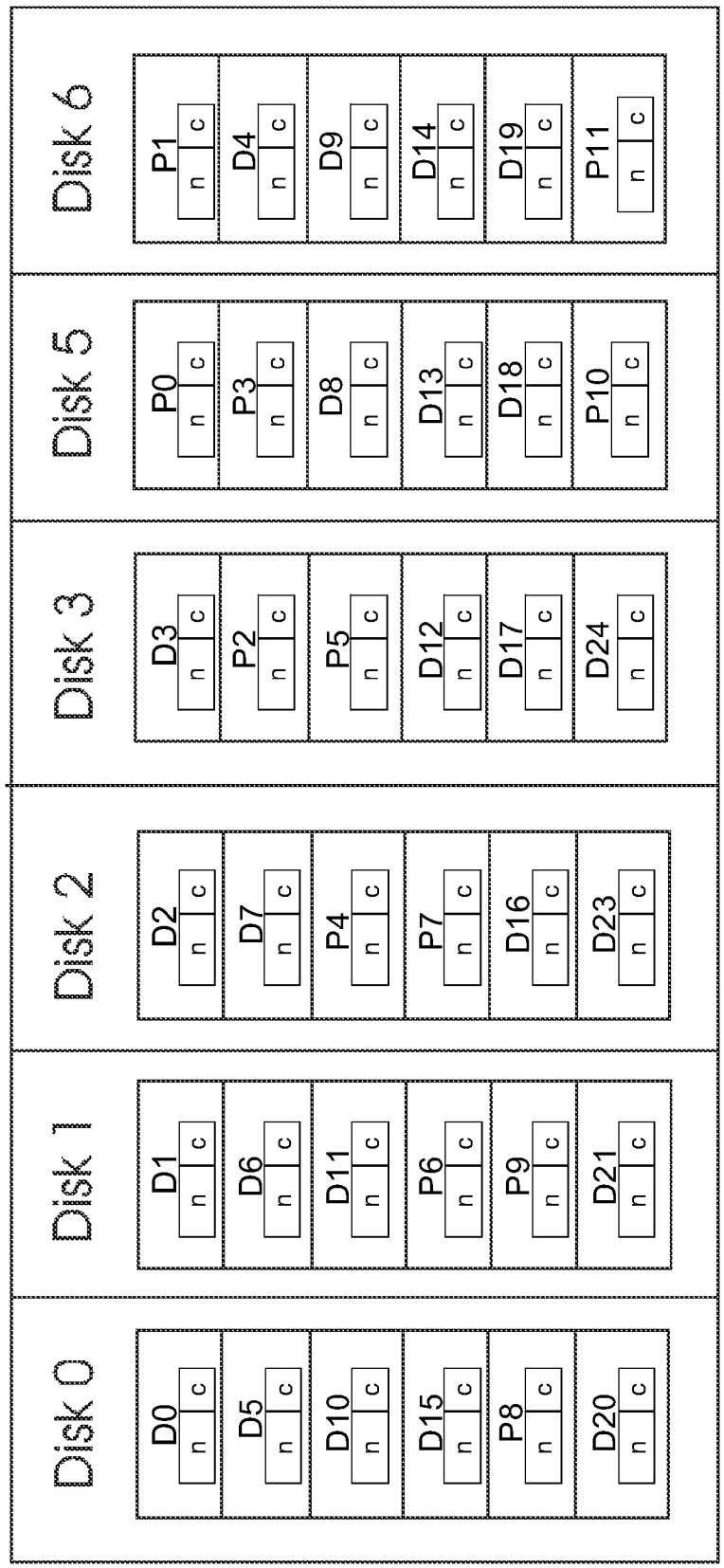
FIG. 4 depicts n data sectors and the c redundancy sectors that are written together on a single storage unit.

According to the invention, a segment of n data sectors is associated with a set of c code (correction code or SPIDRE code) sectors. FIG. 3 depicts an exemplary format arrangement of n data sectors and c code sectors according to the present invention. The n data sectors and the c redundancy sectors are written together on a single storage unit, such as storage unit Disk 0 in FIG. 2. (Also see FIG. 4.) The c sectors protect against uncorrectable media errors up to c sectors within the given data segment. There is no requirement that the n data sectors and the c redundancy sectors be kept separate. By keeping them separate, however, normal read operations are simple and fast.

The present invention provides the advantage of flexible tradeoffs in storage efficiency, performance and reliability, which can be optimized by properly selecting values for n and c. For example, when c is selected to be 10% of n, the resulting storage efficiency is about 91%. Additionally, the performance impact when c code sectors are written is minimized because no seek operation is required. The data and SPIDRE code are written together. Moreover, while write operations for the present invention require a read-modify-write operation, these are, however, performed for a RAID-configured system that provides protection against drive failures "above" the protection provided by the present invention. Thus, the overhead associated with the SPIDRE codes of the present invention involves only the writing of the n+c sectors, instead of writes of the requested sector, which occur for a worst case single-sector write. For a 10,000 rpm HDD having 350 Kbytes per track, reading or writing 64 Kbytes takes about 1 ms. Data reliability is significantly enhanced, particularly when the technique of the present invention is used in conjunction with a technique such as RAID 6.

For example, a code length of 8 sectors over a segment size of 128 sectors (64 Kbytes) will have a storage efficiency of 94% (82.25% when used in a RAID 6-configured system) and have a performance overhead of about 12% when used with 10,000 rpm drives. The number of annual strip kill events will drop from 1.61 to $2.21 \times 10^{-3}$. By selecting proper values of data segment size and code length, the three main parameters affecting RAID system design selection—storage efficiency, reliability and performance—can be optimized at a granularity not available with conventional RAID system configurations alone, which are primarily intended to deal with drive failure.

Table 2 shows a comparison of a RAID 6 system configuration using SPIDRE codes according to the present invention with the other RAID configurations set forth in Table 1.

TABLE 2

|  | RAID 5 | RAID 51 | RAID (3 + 3) | RAID 6 | RAID N + 3 | RAID 6 w/SPIDRE |
|---|---|---|---|---|---|---|
| Drives/array | 8 | 16 | 6 | 16 | 16 | 16 |
| Storage Efficiency | 87.5% | 43.75% | 50% | 87.5% | 81.25% | 82.25% |
| Annual Strip Kill events | 257 | $6.17 \times 10^{-8}$ | $3.56 \times 10^{-8}$ | 0.16 | $7.56 \times 10^{-5}$ | $2.21 \times 10^{-3}$ |
| Annual Array Loss events | 1.48 | $5.01 \times 10^{-8}$ | $3.56 \times 10^{-10}$ | $2.41 \times 10^{-3}$ | $1.51 \times 10^{-6}$ | $2.41 \times 10^{-3}$ |
| Performance (IOs/write) | 4 | 6 | 6 | 6 | 8 | 6.72 |

While SPIDRE codes are illustrated in connection with a RAID 6 system configuration, SPIDRE codes can be used with a system configured for any RAID level, such as RAID 5 and RAID 0. Regardless of the RAID system configuration that the present invention is used with, the combined reliability of the present invention in conjunction with the underlying RAID-configured system is significantly higher than for the RAID-configured system alone.

Several different types of erasure codes can to be used for SPIDRE codes. For example, a Reed-Solomon erasure code, which is a general code, can be selected as a SPIDRE code for protecting any combination of n and c. Alternatively, an XOR-based code can be used for large values of n. Variations of one-dimensional parity can be used as yet another alternative type of erasure code. For instance, one sector from each group of, for example, 8 sectors, is XORed with corresponding sectors from other groups. This alternative approach is simple and protects against media errors of consecutive sectors up to the group size.

While the present invention has been described in terms of storage arrays formed from storage units, such as HDDs, the present invention is applicable to storage systems formed from arrays of other memory devices, such as Random Access Memory (RAM) storage devices (both volatile and non-volatile), optical storage devices, and tape storage devices. Additionally, it is suitable to virtualized storage systems, such as arrays built out of network-attached storage.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for protecting data, the method comprising:
    associating a segment of n data sectors with c redundancy information sectors, wherein the c redundancy information sectors are based on the n data information sectors, and wherein n and c are integer value numbers greater than zero; and
    writing the segment of n data sectors and the c redundancy information sectors on a single storage unit of a multi-storage unit array storage system that uses a RAID-type protection technique for data blocks and parity blocks;
    wherein the n data sectors and the c redundancy information sectors are arranged in a consecutive arrangement together on the single storage unit forming a single consecutive data segment, such that the c redundancy information sectors protect against uncorrectable media errors within the single data segment.

2. The method according to claim 1, wherein the RAID-type protection technique comprises RAID 6.

3. The method according to claim 1, wherein the RAID-type protection technique comprises RAID 5.

4. The method according to claim 1, wherein the RAID-type protection technique comprises RAID 51.

5. The method according to claim 1, wherein the RAID-type protection technique comprises RAID 3+3.

6. The method according to claim 1, wherein the RAID-type protection technique comprises RAID N+3.

7. The method according to claim 1, wherein the redundancy information is based on a Reed-Solomon code.

8. The method according to claim 1, wherein the redundancy information is an XOR-based code.

9. The method according to claim 1, wherein the redundancy information is a one-dimensional parity.

10. The method according to claim 1, wherein the single storage unit is a hard disk drive.

11. The method according to claim 1, wherein the single storage unit is an optical drive.

12. The method according to claim 1, wherein the single storage unit is a random access memory.

13. The method according to claim 1, wherein the n data sectors and the c redundancy information sectors are written consecutively with the n data sectors maintained separate from the c redundancy information sectors in the single data segment.

14. The method according to claim 1, wherein the n data sectors and the c redundancy information sectors are written intermingled in the single data segment.

15. The method according to claim 1, wherein:
    the integer value numbers n and c are selected to optimize one or more of the following: storage efficiency of the multi-storage unit array storage system, reliability of the multi-storage unit array storage system, and performance of the multi-storage unit array storage system, wherein writing the n data sectors and the c redundancy information sectors require a read-modify-write operation.

16. The method according to claim 1, wherein:
    the integer value numbers n and c are selected to optimize each of: storage efficiency, reliability, and performance of the multi-storage unit array storage system, wherein the c redundancy information sectors are written to the single storage unit without a seek operation.

17. A storage system, comprising:
    an array controller; and
    a multi-storage unit array that uses a RAID-type protection technique for data blocks and parity blocks, wherein the array controller associates a segment of n data sectors with c redundancy information sectors, wherein the c redundancy information sectors are based on the n data information sectors, and wherein n and c are integer value numbers greater than zero, and writes the segment of n data sectors and the c redundancy information sectors on a single storage unit of the multi-storage unit array, wherein the n data sectors and the c redundancy information sectors are arranged in a consecutive arrangement together on the single storage unit forming a single consecutive data segment, such that the c redundancy information sectors protect against uncorrectable media errors within the single data segment.

18. The storage system according to claim 17, wherein the RAID-type protection technique comprises RAID 6.

19. The storage system according to claim 17, wherein the RAID-type protection technique comprises RAID 5.

20. The storage system according to claim 17, wherein the RAID-type protection technique comprises RAID 51.

21. The storage system according to claim 17, wherein the RAID-type protection technique comprises RAID 3+3.

22. The storage system according to claim 17, wherein the RAID-type protection technique comprises RAID N+3.

23. The storage system according to claim 17, wherein the redundancy information is based on a Reed-Solomon code.

24. The storage system according to claim 17, wherein the redundancy information is an XOR-based code.

25. The storage system according to claim 17, wherein the redundancy information is a one-dimensional parity.

26. The storage system according to claim 17, wherein the n data sectors and the c redundancy information sectors are written consecutively with the n data sectors maintained separate from the c redundancy information sectors in the single data segment.

27. The storage system according to claim 17, wherein the n data sectors and the c redundancy information sectors are written together and intermingled in the single data segment.

* * * * *